10/10/78   XR   4,120,003   SR

United States Patent [19]
Mitchell et al.

[11] 4,120,003
[45] Oct. 10, 1978

[54] MULTIPLE CHANNEL CATV SYSTEM UTILIZING ROW GRABBER INTERFACE AS CATV INPUT

[75] Inventors: David S. Mitchell, Huntington; Robert H. Nagel, New York, both of N.Y.

[73] Assignee: IDR, Inc., Farmingdale, N.Y.

[21] Appl. No.: 761,611

[22] Filed: Jan. 21, 1977

[51] Int. Cl.² ............................................. H04N 7/18
[52] U.S. Cl. ................................... 358/142; 358/86; 358/93; 358/903; 325/308
[58] Field of Search .................. 358/86, 93, 141, 142, 358/903; 325/308

[56] References Cited

U.S. PATENT DOCUMENTS

| | | | |
|---|---|---|---|
| 3,569,617 | 3/1971 | Allen | 358/93 |
| 3,602,891 | 8/1971 | Clark | 364/900 |
| 3,833,757 | 9/1974 | Kirk | 358/142 |
| 3,836,888 | 9/1974 | Boenke | 358/86 |
| 3,909,818 | 9/1975 | Dalke | 340/324 AD |
| 3,975,585 | 8/1976 | Kirk | 358/86 |

*Primary Examiner*—Howard W. Britton
*Attorney, Agent, or Firm*—Hubbell, Cohen, Stiefel & Gross

[57] ABSTRACT

An improved multichannel CATV type television system includes a real time frame grabbing system for substantially instantaneously providing a selectable continuous video displayable frame of video information to a video interface, such as a row grabbing terminal, for providing a preselected continuous video displayable frame of the information to at least one of the channels as the video information content thereof from continuously transmittable information. The row grabbing terminal receives this information in the form of a plurality of pseudo video scan lines and processes the composite pseudo video scan lines for providing a video displayable row from each of the pseudo video scan line signals pertaining to the preselected frame for providing a selected continuous video displayable frame of dedicated information to a given channel. Normal CATV television signals may be provided to one or more of the other channels wherein the CATV subscriber may receive dedicated common channels of preselected frame grabbable information on normal television signal CATV channels over the CATV television signal distribution network while also receiving conventional CATV television programs. Local video editing of the frame grabbable information may be accomplished and interleaved with a remote pseudo video scan line signal source for providing composite combined interleaved pseudo video scan line signals comprising the preselected grabbed frame.

38 Claims, 12 Drawing Figures

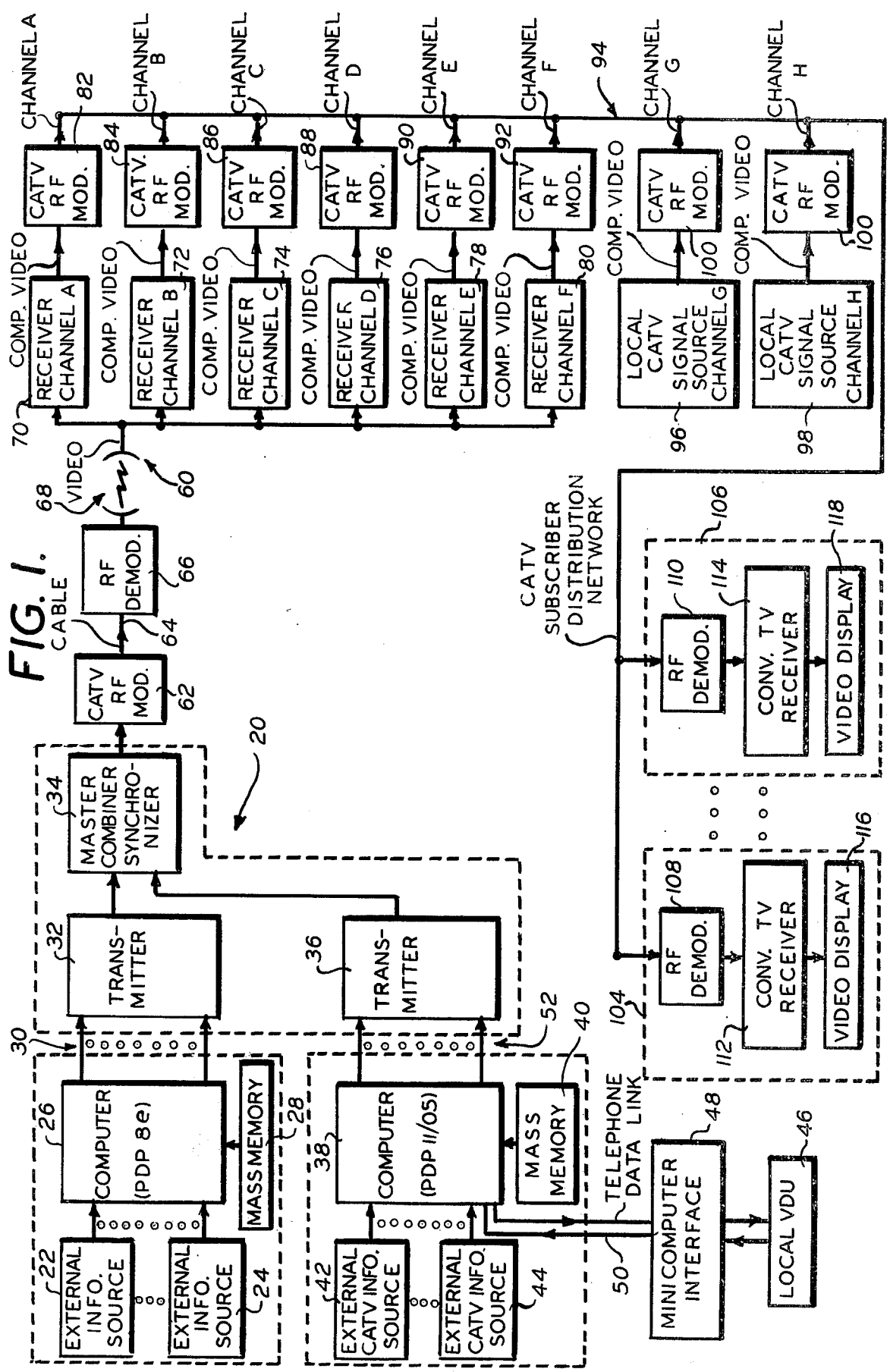

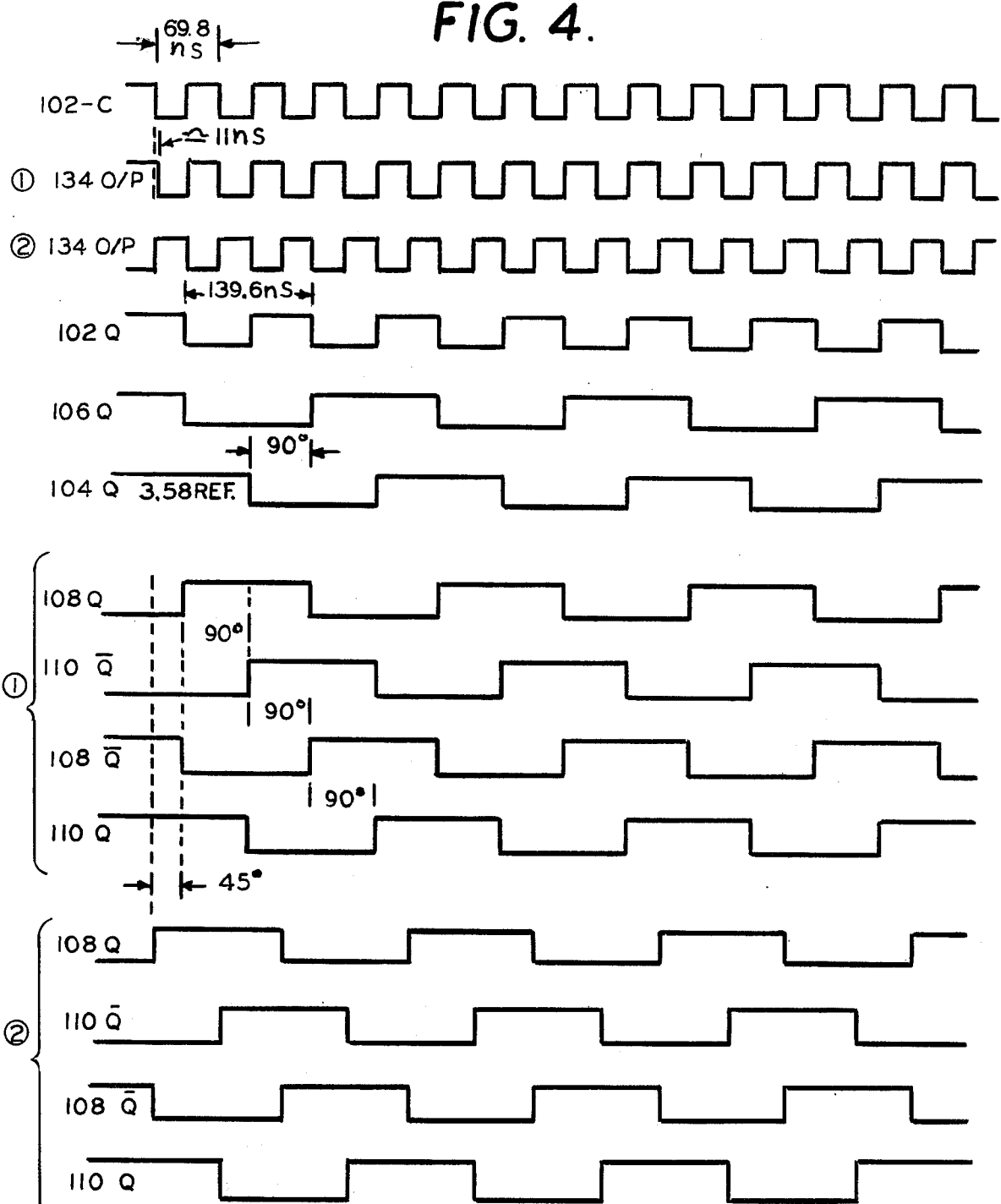

MULTIPLE CHANNEL CATV SYSTEM UTILIZING ROW GRABBER INTERFACE AS CATV INPUT

CROSS-REFERENCE TO RELATED APPLICATIONS

This application is related to commonly owned U.S. Pat. No. 3,889,054, issued June 10, 1975 and the commonly owned copending U.S. patent application of Richard Saylor, entitled "Piggy Back Row Grabbing System", filed June 23, 1976, and bearing U.S. Ser. No. 699,088, now U.S. Pat. No. 4,032,972, the contents of both of which are specifically incorporated by reference herein in their entirety, and to the commonly owned copending U.S. patent application of Richard Saylor, Alfred A. Dalimonte and Robert H. Nagel, entitled "Improved Interleaved Processor and Cable Head", filed Oct. 27, 1976 and bearing U.S. Ser. No. 736,217.

BACKGROUND OF THE INVENTION

1. Field of the Invention

The present invention relates to CATV video communication systems in which grabbed individual frames may be provided through the CATV television signal distribution network for video display thereof on a conventional television receiver.

2. Description of the Prior Art

Video communication systems in which the individual frames may be grabbed for video display are well known, such as the system described in the aforementioned U.S. Pat. No. 3,889,054 or U.S. Pat. No. 3,740,465, or a system employing the Hitachi frame grabbing disc. Moreover, CATV video communication systems in which subscribers are provided with a plurality of selectable CATV channels which are either locally broadcast information and/or rebroadcast information are also well known. With respect to the prior art frame grabbing system, these systems all require that the particular subscriber or user have a special type of receiver terminal for display of the frame grabbable information. Thus, conventional CATV television systems known to the applicants do not provide frame grabbable information updateable on a row-by-row basis on any of the conventional CATV channels thereof for conventional video display on a conventional television receiver along with normal CATV television programming displayable on other CATV channels of the receiver. In addition, conventionally known CATV is limited in its channel capacity due to the number of available conventional television channels and there are no such known prior art CATV systems in which multiple channel information can be provided on a single conventional CATV channel such as by cycling different frames or categories of information. Thus, there are no satisfactory CATV systems known to the inventors herein which are readily utilizable to provide real time frame grabbing information on the conventional CATV channels thereof for providing a video display thereof on a conventional television receiver. These disadvantages of the prior art are overcome by the present invention.

SUMMARY OF THE INVENTION

In a CATV type television system having a first common CATV television signal distribution means, such as the normal CATV subscriber network, for distributing a plurality of selectable video displayable television signal channels of different video information content to a plurality of subscriber normal television multichannel video display devices, such as conventional CATV television receivers, capable of receiving the plurality of channels for providing the selectable video display, and first transmitting means operatively connected to the first common CATV television signal distribution means for providing the plurality of different channels to the first common CATV television signal distribution means, the improvement comprises a real time frame grabbing system for substantially instantaneously providing a selectable continuous video displayable frame of video information to a first video interface means, such as a row grabbing terminal, having a preselected frame address, for providing a preselected continuous video displayable frame of such information to at least one of the channels as the video information content thereof from continuously transmittable information. The real time frame grabbing system comprises second means for transmitting the video information as a plurality of pseudo video scan lines with each of the pseudo video scan lines having a television video scan line format and capable of comprising a complete self-contained packet of digital information sufficient to provide an entire displayable row of video data characters. The pseudo video scan line has an associated transmission time equivalent to that of a television video scan line and the packet of digital information comprises at least address information for the displayable row and data information for the displayable characters in the displayable row with the pseudo video scan line signal being a composite video signal. The real time frame grabbing system further comprises second television signal distribution means for distributing the transmitted composite pseudo video scan line signals to the first video interface means for providing the preselected frame of video information to the one channel with the first video interface means forming a portion of the aforementioned first transmitting means. The first video interface means is operatively connected between the second television signal distribution means and the first common CATV television signal distribution means for processing the distributed composite pseudo video scan line signals for providing a video displayable row from each of the pseudo video scan line signals pertaining to the preselected frame for providing a selected continuous video displayable frame of dedicated information to the one channel. A predetermined plurality of such displayable video rows comprises a displayable video frame of information. In this manner, a plurality of CATV subscribers may receive a dedicated common channel of preselected frame grabbable information on a normal television signal channel over the CATV television signal distribution network.

The row grabbing terminal interface preferably comprises means for updating the preselected frame of information provided to the CATV channel on a displayable video row-by-row basis dependent on the real time data information content of the transmitted pseudo video scan lines from the second transmitting means, whereby the dedicated common channel frame grabbable information is updateable on a row-by-row basis. The updating means preferably comprises memory means for retrievably storing the continuously distributed pseudo video scan line data portion for providing the displayable video row therefrom, with the memory means retrievably stored data portion being continuously updateable as the data portion of the pseudo video scan line signal associated therewith is updated. If desired, other separate video interfaces or row grabbing terminals may be operatively connected between the second television signal distribution means and the first common CATV television signal distribution means with each of the video interfaces being dedicated to a different CATV channel. Moreover, each of the video interfaces or row grabbing terminals preferably has different preselected frame grabbable information processed thereby for providing different dedicated common channels of preselected frame grabbable information on different normal television CATV signal channels over the CATV television signal distribution network. The first transmitting means, normally located at the CATV head end, also preferably includes local CATV signal sources for providing conventional or normal CATV television signal information on other CATV television channels, whereby the CATV subscriber may receive both frame grabbable video information which is updateable in real time on a row-by-row basis as well as conventional normal CATV television programming. Moreover, a given video interface or row grabbing terminal may receive and process a plurality of different frames or pages of information having the same frame address for cyclically providing the plurality of common address frames of information as the dedicated information to the given CATV channel as the distributed composite pseudo video scan line signals pertaining to each of the plurality of common address frames is received by the associated video interface or row grabbing terminal, thus increasing the capacity of the given CATV channel to a plurality of different categories of information, thereby effectively increasing the displayable channel capacity of the CATV system. In addition, local video editing at the CATV head end of the frame grabbable information provided to the row grabbing terminal or terminals for processing thereof for ultimate provision to the CATV subscriber network may be provided, in which instance the pseudo video scan line signals provided to the aforementioned row grabbing terminal or terminals are composite combined interleaved pseudo video scan lines preferably composed of pseudo video scan lines transmitted from a remote source thereof together with pseudo video scan lines transmitted from a source dedicated to one or more CATV company or head end users. The aforementioned combining and interleaving is preferably accomplished in the same manner as described in the aforementioned commonly owned copending U.S. Patent application "Piggy Back Row Grabbing System", bearing U.S. Ser. No. 699,088, filed June 23, 1976, now U.S. Pat. No. 4,032,972 the contents of which was specifically incorporated by reference herein in its entirety. Suffice it to say that the combining and interleaving preferably occurs on an odd/even scan line basis or some other conventional multiport interleaving scheme to provide the composite combined interleaved pseudo video scan line signal.

BRIEF DESCRIPTION OF DRAWINGS

FIG. 1 is a system block diagram of the preferred embodiment of the improved CATV type television system of the present invention;

FIG. 4 is a graphic illustration timing diagram for explaining the operation of the color generation circuitry portion of the color board of FIGS. 2a, 2b and 3;

DETAILED DESCRIPTION OF THE PREFERRED EMBODIMENTS

Figure 2A:
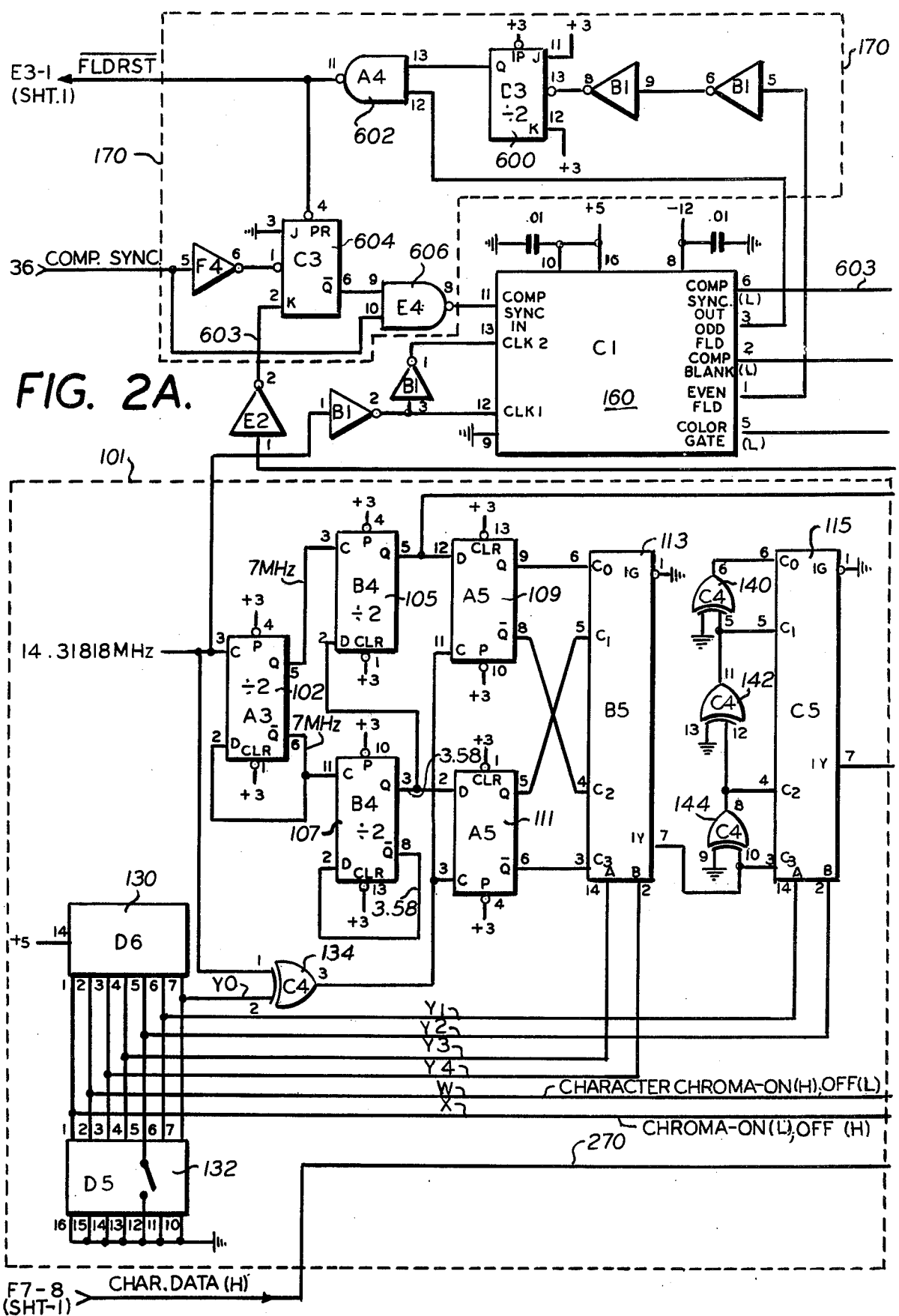
FIGS. 2a, 2b and 3, taken together, are a logic schematic diagram, partially in block, of the color board circuitry portion of a typical dedicated row grabbing receiver interface portion of the improved CATV system of FIG. 1.

Referring now to the drawings in detail, and initially to FIG. 1 thereof, a system block diagram of the presently preferred embodiment of the improved CATV type television system of the present invention, generally referred to by the reference numeral 20, is shown. The system 20 of the present invention preferably includes a remote central processing unit for remotely providing continuously transmitted information or messages via pseudo video scan lines, such as the type described in U.S. Pat. No. 3,889,054, on a row-by-row basis, with such pseudo video scan lines preferably being identical in format to a conventional video scan line, that is consistent with FCC and EIA standards for a video scan line format, however actually containing a row of information, such as approximately between 11 and 13 actual television video scan lines of information, with the transmission time of the pseudo video scan line preferably being equal to the transmission time of a conventional TV video scan line, which is approximately 63 microseconds. Such pseudo video scan lines are conventionally provided in the manner described in U.S. Pat. No. 3,889,054, which is incorporated by reference in its entirety, from a plurality of external information sources, two such sources 22 and 24 being shown by way of example in FIG. 1 which provide an input to a conventional computer 26, such as a Digital Equipment Corporation PDP-8e computer employing a conventional mass memory 28 associated therewith for conventional storage of data. As described in U.S. Pat. No. 3,889,054, computer 26 stores this information in mass memory 28, reformats it, such as by adding header information, and continuously provides this information as a 12 bit parallel output 30 to a transmitter 32, preferably of the type described in U.S. Pat. No. 3,889,054, which transmitter 32 provides the pseudo video scan line to the master combiner synchronizer 34 which master combiner synchronizer 34 is preferably the type identical with that described in the aforementioned copending U.S. patent application entitled "Piggy Back Row Grabbing System", filed June 23, 1976, bearing U.S. Ser. No. 699,088, now U.S. Pat. No. 4,032,972, which application has been specifically incorporated by reference herein in its entirety. Preferably, the other input to master combiner synchronizer 34 illustrated in FIG. 1 is provided thereto from another transmitter 36 which is preferably identical in function and operation to transmitter 32, which is preferably identical to the transmitter described in U.S. Pat. No. 3,889,054. The inputs to the transmitter 36 are preferably provided from another conventional computer 38, such as preferably a Digital Equipment Corporation PDP-11/05S which also has an associated conventional mass memory 40, such as a conventional RK05 cartridge disc memory. The input to computer 38 is preferably local CATV inserted data from conventional external CATV information sources, two such sources 42 and 44 being shown by way of example in FIG. 1, plus any special CATV information. In addition, as shown and preferred in FIG. 1, selection information may be provided to computer 38 from a conventional local VDU or video display unit 46 having a conventional keyboard for providing input and control page information, to be described in greater detail hereinafter, such as concerning the cycling of the data provided to transmitter 36, through a conventional mini-computer interface 48 via a conventional telephone or other data link 50. Thus, as previously mentioned, the output of computer 38, which may preferably be located at the CATV head end, is a parallel bit signal whose bit capacity depends on the computer 38 being utilized, such as 16 bits for a PDP-11/05. This parallel bit signal 52 is provided to the input of transmitter 36, with computer 38 preferably functioning in the manner of computer 26 to store the input information thereto in its associated mass memory 40, reformatted, such as by adding header information, and continuously provide this information as a 16 bit parallel output 52 to transmitter 36 which provides the pseudo video scan line therefrom for transmission to the other input of the master combiner synchronizer 34. This unit 34, which, as previously mentioned, is preferably identical with that described in the aforementioned U.S. patent application entitled "Piggy Back Row Grabbing System", filed June 23, 1976, bearing U.S. Ser. No. 699,088, now U.S. Pat. No. 4,032,972 (see column 6, lines 15–68; column 7, lines 1–11; column 11, lines 9–31; column 13, lines 36–68; columns 14–18; columns 19, lines 1–34; and FIGS. 1–4 of U.S. Pat. No. 4,032,972), is preferably an interleaved processor, such as an odd/even scan line interleaving unit or some other multiport interleaving unit, which combines the pseudo video scan line information transmitted from computer 26 via transmitter 32 with the pseudo video scan line information transmitted from computer 38 via transmitter 36 to generate a composite pseudo video scan line output with, for example, pseudo video scan line information from computer 38 being provided on even scan lines and pseudo video scan line information from computer 26 being provided on odd scan lines, or with any other desired selection scheme dependent on when the master combiner synchronizer 34 is enabled to select pseudo video scan line information from computer 26 and subsequently to select pseudo video scan line information from computer 38, as described in the aforementioned U.S. patent application entitled "Piggy Back Row Grabbing System". Thus, in the example shown in FIG. 1, computer 26 could be providing information from a worldwide news service organization, whereas computer 38 could be providing locally generated CATV information. It should be noted that at any time the plural bit output of computer 26 or computer 38 preferably represents two characters or one word with the associated respective mass memories 28 and 40 being preferably updated by the respective computers 26 and 38 in conventional fashion at the optimum transfer time for data which is, conventionally, not necessarily in the order of reception of the external information from sources 22 and 24 for computer 26, and sources 42 and 44 for computer 38, this data being preferably continuously suppliable in real time to the respective computers 26 and 38. As previously stated, in conventional fashion, the information in respective computers 26 and 38 is preferably supplied to transmitters 32 and 36 and therefrom to interleaver or master combiner synchronizer 34 which conventionally interleaves this information in the manner described in the aforementioned copending U.S. patent application entitled "Piggy Back Row Grabbing System" and, therefrom, is supplied to a conventional CATV cable distribution network 60 through a conventional CATV RF modulator 62, composite video being supplied to modulator 62 from the interleaved output of master combiner synchronizer 34. One such modulator 62 is preferably provided for each television channel on which information is to be transmitted, only one such modulator 62 being illustrated by way of example in FIG. 1. Preferably, the mass memories 28 and 40 have sufficient storage capacity to store the desired page capacity of the row grabbing system. As shown by way of example in FIG. 1, if desired, the output of modulator 62 could be fed via a conventional cable link 64 and therefrom through a conventional RF demodulator link 66 over a conventional microwave link 68 to be picked up by a remotely located CATV distribution network 60. As shown and preferred in FIG. 1, this CATV distribution network 60 preferably comprises a parallel network including a plurality of conventional channel assigned row grabbers or receivers, with six such receivers 70, 72, 74, 76, 78 and 80, for channels A through F being shown by way of example in FIG. 1. These receivers or row grabbing terminals 70 through 80 are each preferably fixed programmed row grabbers which are preferably identical in structure and operation to the receivers or row grabbing terminals described in U.S. Pat. No. 3,889,054 with the exception that the grabbers are not user selectable but rather have specific pages and groups assigned to the grabbers 70 through 80, such as by hard wiring thereof, and which grabbers 70 through 80 also preferably do not include permission logic since such logic is not required in such an instance. As previously mentioned, each of the grabbers 70 through 80 preferably has an assigned specific channel A through F, respectively, with each of the grabbers 70 through 80 preferably having different fixed or assigned pages and groups so that different information is provided on each of the respective channels A through F. The output of each of the conventional row grabbers 70 through 80 is preferably conventionally provided to a conventional RF modulator 82 through 92, respectively, in conventional fashion, the signal being provided thereto being composite video, and therefrom into the normal or conventional CATV subscriber television distribution network 94 which, from this point forward in the system, is preferably a conventional CATV television distribution network. However, as further shown in FIG. 1, if desired, distribution network 94 may also receive locally generated CATV signal information from conventional local CATV signal sources, with two such sources 96 and 98 being shown by way of example in FIG. 1, for channels G and H by way of example, which information has been picked off the air in conventional fashion consisting of information other than that provided from the row grabbers 70 through 80, this information being conventionally provided to the CATV distribution network 94 through conventional CATV RF modulators 100 and 102, respectively, to provide row grabbed information and conventional or normal CATV signal information on a plurality of channels, such as channels A through H by way of example, via the conventional CATV subscriber television distribution network 94 to the local CATV subscriber, with two such subscribers 104 and 106 being shown by way of example in FIG. 1. As shown and preferred in FIG. 1, the subscriber 104 or 106 preferably has a conventional RF demodulator 108 or 110, respectively, which then provides the signal to a conventional television receiver 112 or 114, respectively, whose output is provided to a conventional video display device 116 or 118, respectively. Thus, as will be described in greater detail hereinafter, the CATV subscriber 104 or 106 is able to view both conventional or normal CATV television signal information as well as row grabbed information which is updated in real time on a row-by-row basis on a conventional television receiver 112 or 114. Moreover, as will be further explained in greater detail, the given channel for providing row grabbed information, such as channel A, can provide a plurality of different pages or frames of row grabbed information in cyclical fashion with each page or frame being updateable on a row-by-row basis, by providing the same receiver, receiver 70 by way of example, address for a plurality of pages or frames in the pseudo video scan line information being transmitted as the interleaved output of master combiner synchronizer 34. Of course, if desired, instead of using the dedicated grabbers 70 through 80, the system could provide the information directly to the subscriber network 94 and therefrom to subscribers who had conventional row grabbers capable of providing page or frame selection, such as described in U.S. Pat. No. 3,889,054.

Now the improved system 20 of the present invention shall be described with respect to a typical pre-programmed or fixed grabber 70 in the dedicated grabber grouping 70 through 80, inclusive, for enabling the specific provision of a dedicated group or page for subsequent provision to the conventional CATV subscriber television distribution network 94 for providing row grabbed information which is updateable on a row-by-row basis on a given channel, such as channel A, of the CATV system.

Figure 2B:
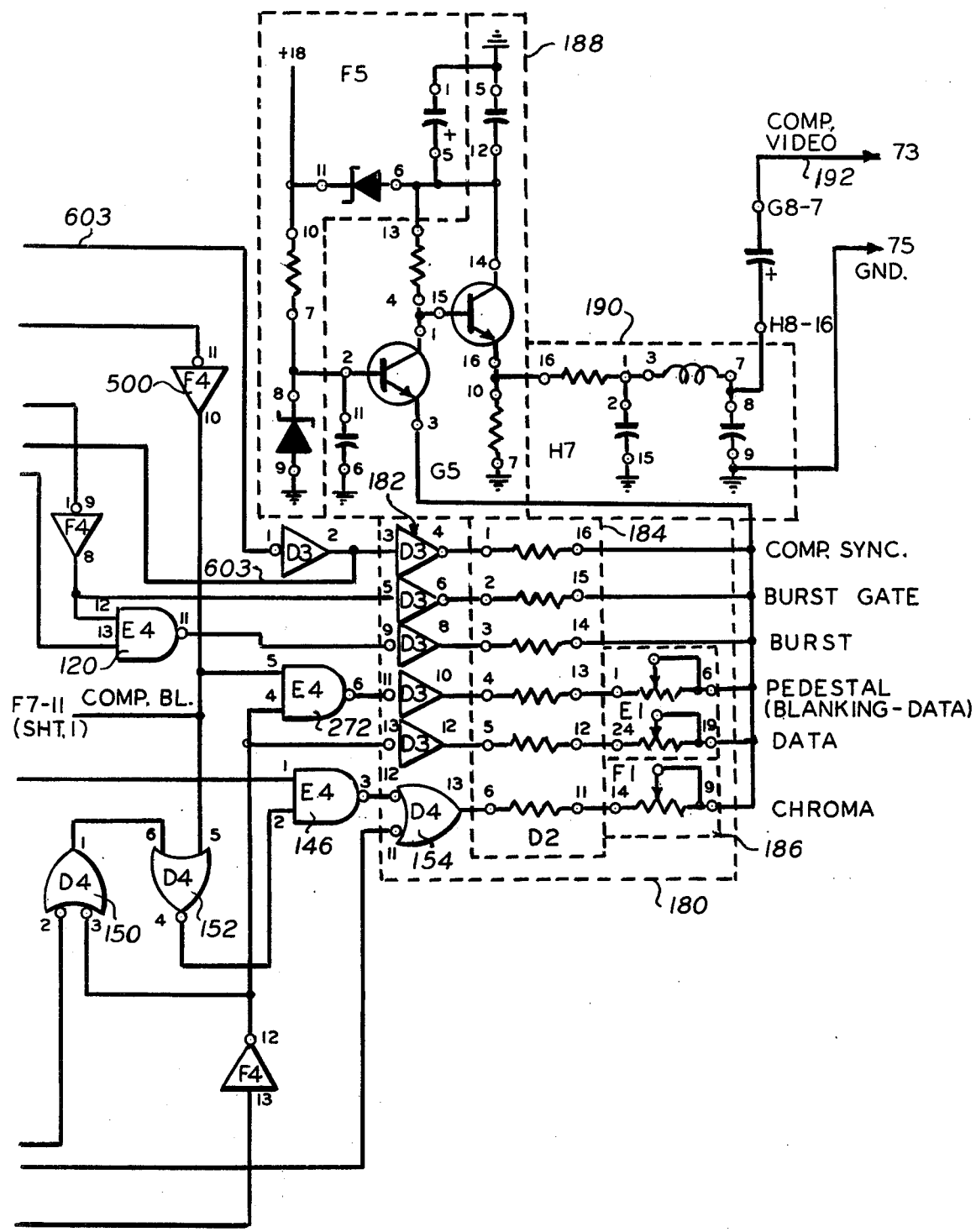
Figure 3:
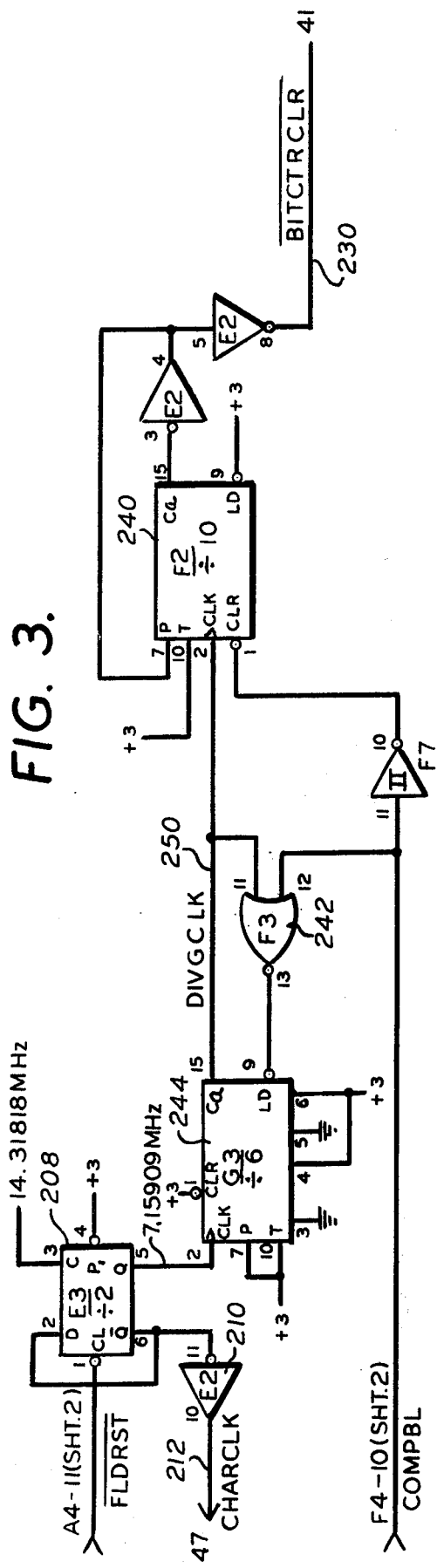

Referring now to FIGS. 2 and 3 which, taken together, provide a logic schematic diagram, partially in block, of the color board circuitry portion of a typical dedicated row grabbing receiver interface, such as receiver 70, of the CATV system 20 of the present invention. The color board interfaces with such a conventional row grabbing terminal 70 to provide the proper formatted information for provision to the conventional CATV television distribution network 94. As was previously mentioned, the dedicated or fixed pre-programmed grabber 70 preferably does not have the ability to selectively interface with the keyboard, unlike the row grabbing terminal described in U.S. Pat. No. 3,889,054, with this being accomplished by replacing the conventional keyboard latches employed in such a terminal of the type described in U.S. Pat. No. 3,889,054 which would conventionally store the keyboard command, with a preprogrammed latch condition for a specific group and a specific page, such as group 127, page 1, by way of example. In such an instance, the dedicated grabber or receiver 70 will only receive that information which is assigned or addressed to that specific group and page. Of course, as previously mentioned, the page 1 address could, in reality, contain information which is cycled through for what would normally be considered several pages of the conventional grabber described in U.S. Pat. No. 3,889,054 by means of having the same page address for several pages of information although, as far as the particular dedicated grabber 70 is concerned, that information cannot be varied at will by the grabber since the keyboard selection function has been omitted from the dedicated grabber 70. Instead, the grabber or receiver 70 must view or display all of the cycling information contained on the group 127, page 1 address and cannot, for example, view or display information which is contained at a different address, such as group 127, page 2, which information, as previously described, would preferably be assigned or addressed to a different grabber in the dedicated grabber grouping 70 through 80, inclusive. Similarly, another address, such as group 127, page 3 would be assigned or addressed to a different grabber of the grouping 70 through 80, inclusive, and group 127, page 4, by way of example, would be assigned or addressed to still a different grabber of the dedicated grabber grouping 70 through 80, inclusive, and so on so as to provide the specific fixed cycling information for channels A through F in the example given. In describing the color board shown in FIGS. 2 and 3, by way of example, the manner in which this color board interfaces with the fixed preprogrammed conventional type of row grabber 70, by way of example, to enable the desired information format for display shall be described, with this typical grabber 70, as previously mentioned, preferably being otherwise conventional in circuitry to that previously described in U.S. Pat. No. 3,889,054 for a selectable type of row grabber, other than the aforementioned change in the latching network to make it a fixed or pre-programmed type of grabber with the further conventional modifications necessary for the signals to be operated on by the color board of FIGS. 2 and 3. Thus, as previously mentioned, with respect to a conventional type of row grabber such as described in U.S. Pat. No. 3,889,054, such a grabber is preferably modified to defeat the functioning of the permission logic so as to enable it to be used as a fixed pre-programmed grabber without undue long waiting time if there is an inadvertent power loss for the grabber 70 which would cause the user to have to wait until the permission for the specific group and page to which the dedicated grabber was assigned was transmitted so that the grabber 70 could once again be functioning. Thus, the defeating of the permission logic is one of expediency since the grabber 70 is fixed to one group and one page and is not concerned with the problem of a user selecting an unauthorized group and page.

Thus, apart from the modifications to the conventional row grabbing terminal discussed above, it can be assumed that the color board of FIGS. 2 and 3 receives a 14.31818 megahertz input oscillator signal, by way of example, which is provided in conventional fashion from a locator oscillator and which is locked to the incoming color burst which is conventionally provided in the interleaved output of master combiner synchronizer 34 in the manner previously mentioned in the aforementioned copending U.S. patent application entitled "Piggy Back Row Grabbing System". As will be described in greater detail hereinafter, this 14.31818 megahertz oscillator signal is preferably provided in parallel to several components of the color board of FIGS. 2a, 2b and 3. For example, this oscillator signal is provided to a conventional color generator 101 which preferably consists of a plurality of conventional flip-flops 103, 105, 107, 109 and 111, and a pair of conventional multiplexers 113 and 115. The output of the color generator 101 is preferably the conventional color subcarrier signal which is approximately 3.58 megahertz. It is, of course, the phase of the 3.58 megahertz color subcarrier with respect to the color burst signal which conventionally determines the hue. Thus, the color generator 101 preferably conventionally functions to first divide the 14.31818 megahertz input oscillator signal in conventional fashion to obtain the 3.58 megahertz color subcarrier signal as well as to control the phasing of this signal to insure that it is in the proper phase relationship with the color burst to achieve hue. In order to accomplish this, conventional flip-flops 103, 105 and 107 are conventional divide-by-2 flip-flops with the output of flip-flop 103 preferably being approximately a 7 megahertz output signal provided on the Q output in the example shown and on the inverse or $\overline{Q}$ output with these two 7 megahertz output signals of flip-flop 103 being 180° out of phase. With respect to the Q output of flip-flop 103, this signal is preferably provided as the clock input to flip-flop 105 while the $\overline{Q}$ output of flip-flop 103 is preferably provided as the clock input to flip-flop 107. Preferably, flip-flops 103, 105, 107, 109 and 111 are all conventional D type flip-flops. The output of flip-flop 107 is, once again, two signals which are 180° out of phase on the Q and $\overline{Q}$ outputs thereof, with each of these output signals being the 3.58 megahertz signal since the clock signal thereto was approximately 7 megahertz or 7.16 megahertz. The Q output of flip-flop 107 is preferably provided in parallel as the data input to flip-flop 111 and as the data input to flip-flop 105. With respect to flip-flop 105, as previously mentioned, its clock input is the 7.16 megahertz Q output of flip-flop 103, thus providing a 3.58 megahertz output signal as the Q output of flip-flop 105. This Q output of flip-flop 105 is preferably 90° out of phase with the 3.58 megahertz Q output of flip-flop 107. Thus, at this point, there are two 3.58 megahertz waveforms, the Q outputs of flip-flops 105 and 107, which are 90° out of phase with each other. The Q output of flip-flop 105 is preferably provided in parallel with the data input to flip-flop 109 and to one input of a conventional two input NAND gate 120 to provide the reference color burst. A conventional switching network which comprises a conventional resistive network 130 and a switch 132 is connected to one input of a conventional exclusive OR gate 134 so that the output of the exclusive OR gate 134 is conventionally selectable between one phase or the opposite phase of the 14.31818 megahertz clock. The output of exclusive OR gate 134 is preferably used to clock flip-flop 109 and 111 whose data inputs are the previously mentioned two 90° out of phase 3.58 megahertz signals provided from flip-flops 105 and 107. The Q outputs of flip-flops 109 and 111 are 90° out of phase with respect to each other due to their input signals being 90° out of phase. As a result, four 3.58 megahertz signals are provided at the Q and $\overline{Q}$ outputs of flips-flops 109 and 111 which are 90° out of phase with respect to each other and are related to the color burst reference signal previously described. Thus, exclusive OR gate 134, under control of switch 132 preferably shifts or does not shift the output signals provided by flip-flops 109 and 111 by 45°. Thus, these outputs now make available eight phases of the 3.58 megahertz color subcarrier signal, which phases are each 45° apart. Thus, as stated above, four 90° out of phase signals are provided to the conventional multiplexer 113 which selects one phase at a time in accordance with the preset selection condition of switching network 130-132. Thus, by determining the selected phase of the 3.58 megahertz color subcarrier signal, the hue or color background can be changed due to a change in phase relationship between the color subcarrier and the color burst signal. The operation of the multiplexer 113 in conjunction with the switching network 130-132 and the aforementioned flip-flops 103, 105, 107, 109 and 111 to provide eight 3.58 megahertz color subcarrier signals which are 45° apart in phase depending on the condition of switching network 130-132 is graphically illustrated in FIG. 4.

As further shown and preferred in FIGS. 2a and 2b, the output of multiplexer 113 is preferably fed to another conventional multiplexer 115 through a conventional delaying network, such as one preferably comprising three conventional exclusive OR gates 140, 142 and 144 which each successively delay the input thereto by approximately 15°. The purpose of delaying network 140, 142, 144 being at 15° spacings is to preferably fill in the gaps between a 45° spacing as provided from multiplexer 113 to further subdivide the interval into 15° intervals as opposed to 45° phasing intervals. Multiplexer 115, like multiplexer 113, is preferably controlled by means of the switching network 130-132. The output of multiplexer 115 is preferably provided as one input to another two input conventional NAND gate 146. The purpose of the gating network shown in FIG. 2 which comprises NAND gate 146, OR gate 150, NOR 152, OR 154 and inverter 500, is to preferably kill the color subcarrier signal during the blanking interval, during provision of the characters, or permanently, the latter two being under control of the switching network 130-132.

The various composite sync, burst gate, and composite blanking signals which are required in the output waveform are preferably conventionally provided from a conventional color video synchronizing integrated circuit chip 160, such as what is conventionally termed a "sync pulse generator", such as the type manufactured by Fairchild and commercially available as Fairchild Model No. 3262B TV sync generator Gen-Lock. The operation of sync generator chip 160 is conventional and will not be described in greater detail hereinafter except to say that the clock signals therefor are provided by the previously mentioned master 14.31818 megahertz clock signal, with the clock 1 and clock 2 inputs of sync generator chip 160 preferably being 180° out of phase in conventional fashion. Sync generator chip 160 preferably has as one input thereto the composite sync signal normally provided from the row grabbing terminal 70. However, because of the possibility of jitter problems occurring in the composite sync output of the row grabbing terminal 70, by way of example, a reset network 170 is preferably employed in conjunction with sync generator chip 160 to readjust the output to insure that the synchronizing input is only applied to sync generator chip 160 if the input composite sync from the terminal 70 and the output composite sync from the chip 160 are out of phase by a predetermined amount, such as preferably approximately 1 microsecond or more, and then, in such an instance, only for a limited period, such as preferably the time required for a maximum of four complete fields.

Figure 6:
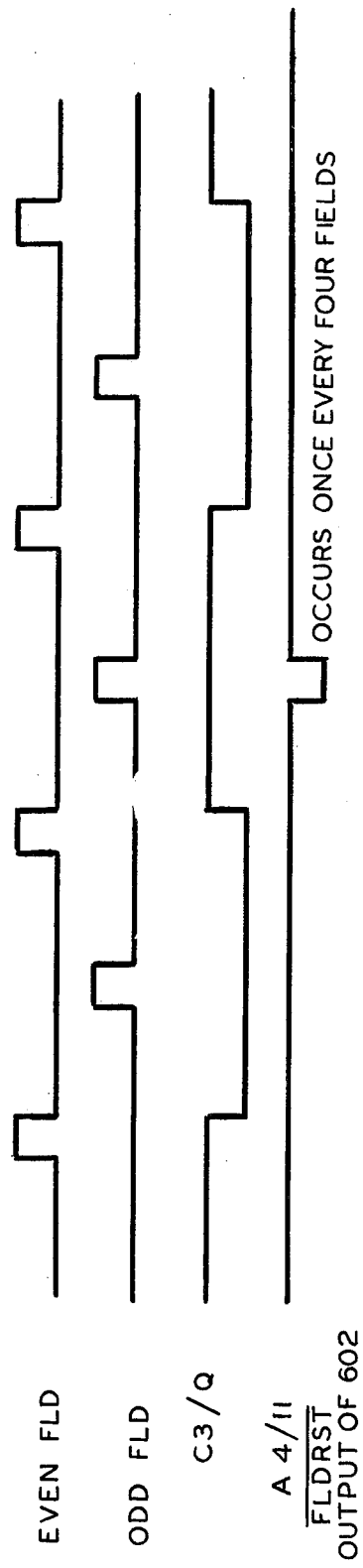
FIG. 6 is a graphic illustration timing diagram for explaining the operation of the reset network portion of the color board illustrated in FIGS. 2a and 2b.

Now describing the operation of reset network 170, flip-flop 600 of this reset network 170 is preferably a conventional divide-by-2 -1 flip-flop used to divide the even field signals by 2 as graphically illustrated in FIG. 6. The output of flip-flop 600 is preferably gated by a conventional NAND gate 602 which receives the output of flip-flop 600 as one input thereto and receives as the other input thereto the odd field output of sync generator chip 160. The output signal from NAND gate 602 is illustrated in FIG. 6 and is labeled as the "inverted field reset signal". This output signal from NAND gate 602 preferably occurs once every four fields and lasts for the duration of the odd field signal, with this output signal being provided in parallel as the preset input to another conventional JK flip-flop 604. Flip-flop 604 preferably compares the incoming composite sync from the terminal 70 which is provided as the input signal thereto through a conventional inverter with the composite sync output of sync generator chip 160, which composite sync output is provided to the K input of flip-flop 604 via path 603. Sync generator chip 160 is preferably operated under Gen-Lock and internal reset to index the first equalizing pulse in the odd field which causes the composite sync output of sync generator chip 160 and the composite sync input to synchronize such that the composite sync output occurs before the composite sync input by a predetermined interval, such as typically 500 nanoseconds. The above characteristics of sync generator chip 160 insure that flip-flop 604 will not set from its preset condition unless the composite sync signals being compared at the input thereof differ by more than approximately 1 microsecond in the example given above. If this difference exists, then flip-flop 604 will change state thereby providing a $\bar{Q}$ output signal to one input of a conventional two input NAND gate 606 whose other input is the composite sync provided from the terminal 70. Accordingly, an output signal will then be provided at the output of NAND gate 606, which output signal is thereafter provided as the composite sync input signal to sync generator chip 160, this composite sync input signal from NAND gate 606 preferably being provided to sync generator chip 160 for a maximum of four fields due to the preset signal being provided thereto from the output of NAND gate 602 as was previously described. The input signal from NAND gate 606 is preferably supplied to the composite sync input of sync generator chip 160 for a maximum of four fields to preferably insure that sync generator 160 will acquire correct Gen-Lock to the correct field.

Now referring to the mixing network 180 which mixes the various input signals thereto to provide the composite video output signal from the color board of FIGS. 2a, 2b and 3. Mixing network 180 preferably comprises a plurality of conventional inverters 182 as well as the previously mentioned OR gate 154, with inverters 182 and OR gate 154 each comprising a respective resistor contained in resistor network 184. Appropriate values of the resistances of impedances in resistor network 184 are conventionally chosen to provide the appropriate conventional mix to produce the composite sync, burst gate, burst, pedestal, data and chroma signal components of the composite video output signal, with typical values of these resistances being illustratively shown in FIGS. 2a and 2b. The resistors 184 associated with the pedestal, data and chroma signals have their outputs fed through respective potentiometers of potentiometer network 186, which potentiometers have parameters associated with the pedestal, data and chroma signals which may be varied or controlled in accordance with adjustment of the associated potentiometers 186. These output signals from mixing network 180 are preferably in turn fed to a conventional output amplifier 188 whose output is in turn fed through a conventional 3.58 megahertz cut-off filter network 190 which network 190 is preferably a conventional band pass type of filter which allows passage of all signals up to 3.58 megahertz and prevents the passage of signals in excess of this frequency. The output of filter 190 is the composite video output signal which is preferably provided via path 192 through modulator 82, in the example of receiver 70, for subsequent provision to the conventional CATV subscriber television distribution network 94.

Figure 5A:
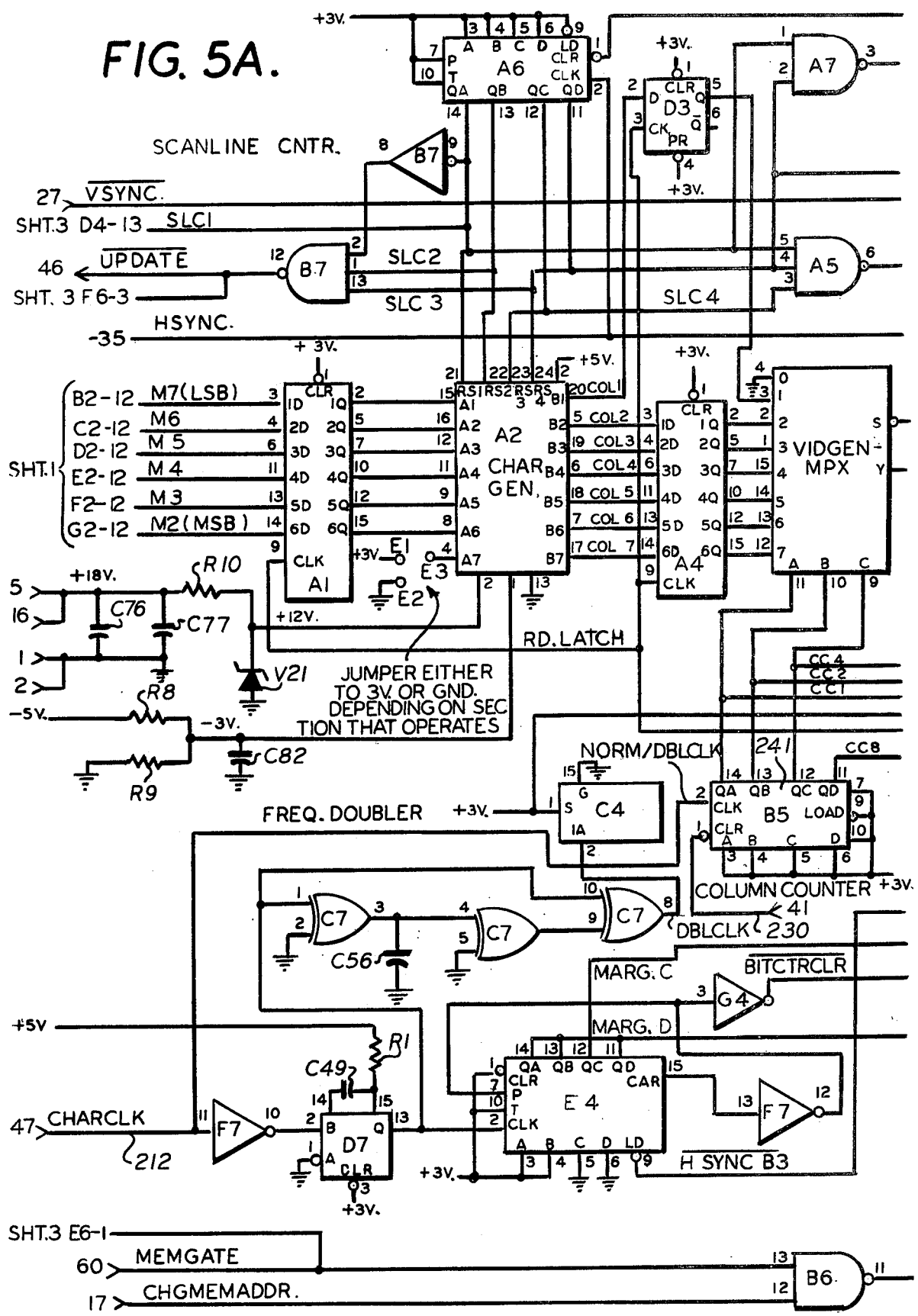
FIGS. 5a and 5b are a logic schematic diagram, partially in block, of the memory and character processing portion of a typical row grabbing receiver interface portion of the improved CATV system of FIG. 1.
Figure 5B:
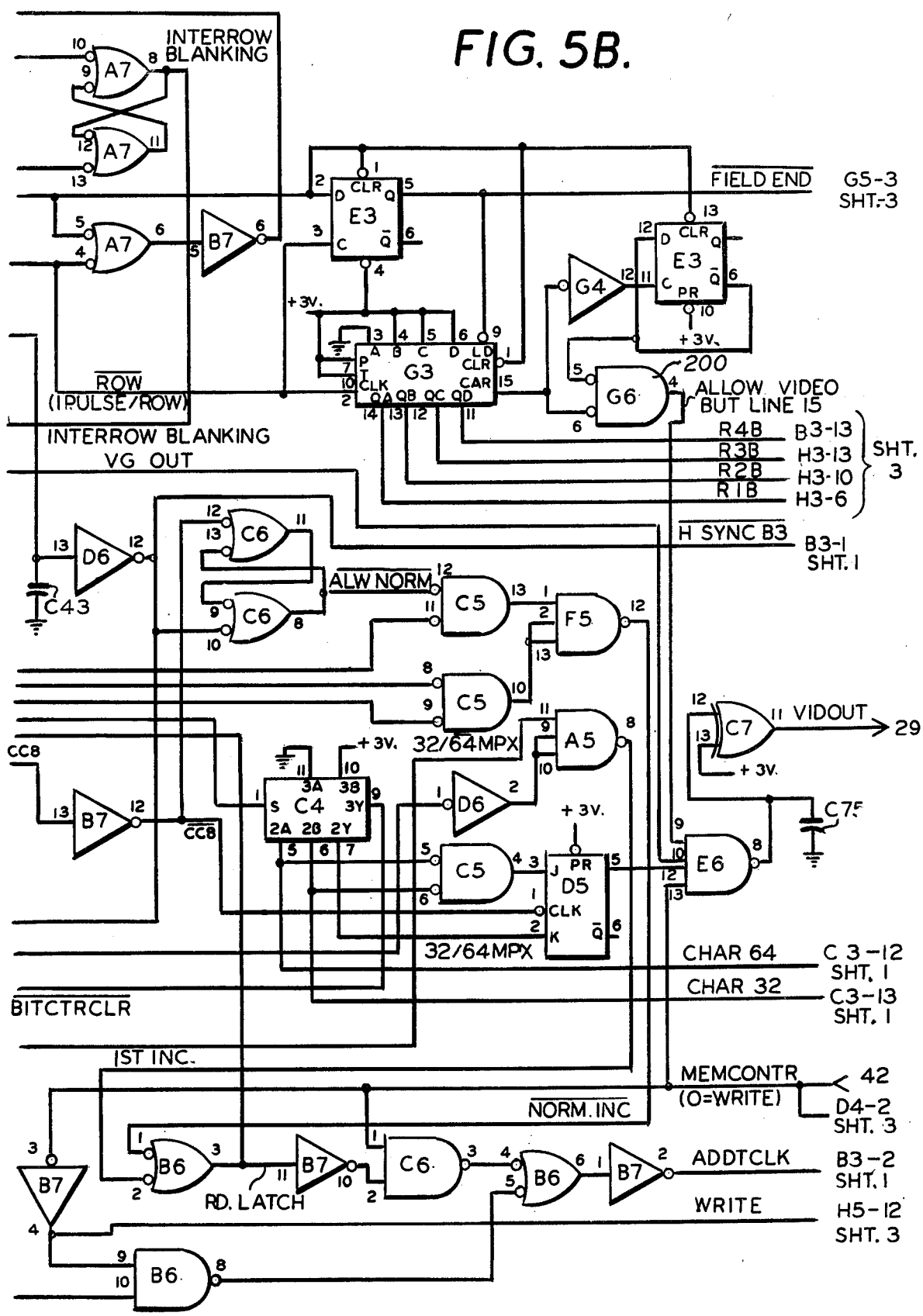

Now referring to FIG. 5, a logic schematic diagram, partially in block, of the conventional memory and character processing portion of a typical row grabbing receiver interface, such as terminal 78, is shown, with the circuitry thereof preferably being identical to that described with reference to the conventional row grabbing terminal described in U.S. Pat. No. 3,889,054, such as the memory and character processing portion thereof described in U.S. Pat. No. 3,889,054 with reference to FIGS. 6, 7, 12 and 13 of said patent, except for the modifications thereto to be described in greater detail hereinafter for providing "safe title". As used hereinafter, the term "safe title", refers to the control of the video display mask area of the signal which is provided at the output of the terminal 70 since a conventional television monitor can display a wider display mask than is available for display on the conventional home TV receiver, such as a video display 116 or 118, which is being serviced by the CATV subscriber network 94. Accordingly, this display mask has to be shrunk so as to enable display of all of the information provided by the receiver or row grabbing terminal 70, by way of example, on the display mask without loss of any of the information in the margins. For example, the system may be arranged to preferably display 32 characters per row for a total of 14 rows in this display. If desired, this arrangement could be varied, for example, to display 64 characters per row for up to 16 rows. The stage of the memory which in the conventional row grabbing terminal would normally control 32/64 character selection is preferably grounded so as to lock the terminal 70 to the 32 character mode which is presently preferred. To insure against any inadvertent display of the contents of rows 15 or 16 on the television display when a 14 row display is desired, as is presently preferred, an AND gate 200 is inserted as shown in FIG. 5, to insure that nothing beyond row 14 is read out memory. Thus, a 32 character per row, 14 row display is insured. To shrink the display mask to insure that this display fits the display on the conventional home television screen, the following must be accomplished. The conventional timed clock column counter clear signals which are normally utilized to control the conventional row grabbing terminal such as described in U.S. Pat. No. 3,889,054, are preferably replaced by new clocking signals termed the "character clock" and the "bit counter clear signal". The "character clock" which is utilized in the memory and character processing board of FIG. 5 is preferably generated from the color board previously described with reference to FIGS. 2 and 3 by processing of the aforementioned 14.31818 megahertz master clock signal to provide a 7.159 megahertz signal as the character clock. This is accomplished by feeding the 14.31818 megahertz master clock signal through a conventional divide-by-2 flip-flop 208 and subsequently through an inverter 210 to provide the character clock via path 212 (FIG. 3). The field reset output of the previously mentioned reset network 170 is used as the clear pulse for flip-flop 208 in order to insure that the character clock provided via path 212 is only provided when needed.

As long as the bit counter clear pulse is provided via path 230, as illustratively shown in FIG. 5, the column counter of the memory and character processing portion of the row grabbing receiver terminal 70, by way of example, is held in a reset condition and no data is generated in the row grabbing terminal 70. The composite blanking output signal of the aforementioned sync generator chip 160 is preferably utilized as the clear pulse for a conventional divide-by-10 shift register 240 in order to preferably prevent the bit counter clear pulse from being provided on path 230 to the column counter during the presence of composite blanking. The presence of such composite blanking signals are detected via a conventional NOR gate 242 whose output is connected to the load input of another conventional divide-by-6 shift register 244. The output signal from NOR gate 242 preferably holds this shift register 244 in a load condition during the presence of composite blanking in order to prevent the shift register 244 from counting. When composite blanking is no longer present, in other words the moment that the composite blanking signal ceases, shift register or counter 244 starts counting since the signal which holds the shift register 244 in a load condition is no longer present. Preferably, after counter 244 counts six clock pulses, by way of example, a carry output is provided via path 250 to the clock input of shift register or counter 240. This carry output which is provided via path 250 is also preferably fed in parallel through NOR gate 242 to the load input of counter 244. Thus, every six clocks, in the example given, in the absence of the composite blanking signal, counter or shift register 244 will subsequently provide a clock signal to the clock input of counter or shift register 240. Counter 240 in turn preferably counts 10 clock inputs, in the example given, provided via path 250, the carry output of counter 244. However, it should be noted that in order to have conventional counter or shift register 240 count 10 counts, only 54 clock pulses need be provided to the input of counter 244. Preferably, when counter or shift register 244 counts to 10, (FIG. 3) it removes the bit counter clear pulse which was provided via path 230 and thus enables the column counter 241 (FIG. 5) associated with the memory and character processing portion of the receiver terminal 70 to count the character clocks which are provided thereto via path 212. This, in turn, enables the provision of data from the row grabbing terminal 70 in order that the character video output of the conventional row grabbing terminal 70 is provided as character data to the previously mentioned color board (FIG. 2) via path 270. This character data provided via path 270, as previously mentioned, is preferably fed into mixing network 180 through conventional gating, such as NAND gate 272, to provide blanking and data signals as illustratively shown in FIG. 2. As shown and preferred in FIG. 5, since the preferred row grabbing receiver terminal 70 through 80 utilized in the CATV system 20 of the present invention is preferably a dedicated or fixed pre-programmed grabber, the various portions of the conventional memory and character processing portion of such a row grabbing terminal, such as the selectable page terminal described in U.S. Pat. No. 3,889,054, which are associated with keyboard selection are tied to ground, such as, by way of example, the connection labeled keyboard erase. Of course, if the dedicated grabbers 70 through 80 were replaced with the conventional keyboard selectable grabbers such as described in U.S. Pat. No. 3,889,054, the ground connections for the associated keyboard circuitry would be removed and the conventional keyboard connections described in U.S. Pat. No. 3,889,054 would be utilized. In addition, preferably the dedicated row grabbing terminals 70 through 80 employed in the system 20 of the present invention are further conventionally modified so as to eliminate the override condition control and directed message control, described in greater detail in U.S. Pat. No. 3,889,054 and incorporated by reference herein, by tying these associated control signals to ground. Thus, the dedicated row grabbing terminals 70 through 80 employed in the system 20 of the present invention preferably immediately go into a permission granted mode, such as described in U.S. Pat. No. 3,889,054, when power is turned on as opposed to having to conventionally wait until a permission signal is provided as would be necessary in the keyboard selectable grabber terminal described in U.S. Pat. No. 3,889,054.

Figure 10:
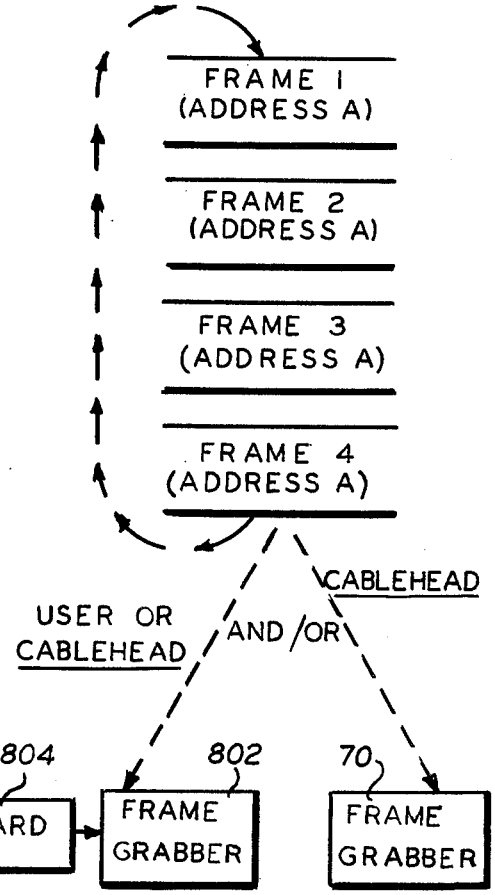
FIG. 10 is a diagrammatic illustration for explaining the operation of the row grabber receiver interface portion in accordance with FIG. 8.

The aforementioned dedicated row grabbing terminal 70 through 80 of the present invention, of which the previous description of row grabbing terminal 70 is typical, thus preferably act as an interface between the normal CATV subscriber and a remote system which additionally provides a row grabbable continuously transmittable pseudo video scan line data output, such as the type of system described in U.S. Pat. No. 3,889,054, so that a conventional CATV channel can provide updateable row grabbed information on a conventional home television receiver through the normal CATV subscriber television distribution network without any modification to the normal home television receiver. Furthermore, as will be explained further hereinafter, such a given channel can be packed with a plurality of different pages or categories of cycled information so as to effectively increase the channel capacity of the CATV system without actually increasing the number of channels. Such row grabbed information is preferably not selectable at the option of the CATV subscriber but, as previously mentioned, is dedicated at the CATV transmitting end to whatever group and page the particular dedicated row grabbing terminal 70 through 80 interface is dedicated to. However, as previously mentioned, a dedicated row grabbing interface terminal 70, for example, may cycle several pages of a given group, with each page containing different information, and with each page being updateable in real time on a row-by-row basis, by employing the same grabber or terminal 70 address for a plurality of such pages. Such an example is illustrated in FIG. 10. In the example of FIG. 10, assuming that four different pages are to be cycled on a given CATV channel, such as channel A in the example given, then the same row grabbing terminal address for terminal 70, such as address A by way of example, would be employed for all four pages or frames. In such an instance, row grabbing terminal 70 having address A would first grab page or frame 1 of the group of four pages having this address as the continuously transmitted pseudo video scan line interleave transmission is provided to the distribution network 60 in the manner described in U.S. Pat. No. 3,889,054 and the aforementioned patent application which is included by reference herein, and will subsequently provide a composite video signal corresponding to a video display of this page on channel A when channel A is selected by the CATV subscriber 104 or 106, by way of example. Subsequently, as the next page or frame of this grouping of four pages having address A is provided to distribution system 60, the row grabbing terminal 70 will conventionally erase the previously provided page or frame 1 and provide a composite video signal corresponding to video display of page or frame 2 having this address. Subsequently, this will occur for each page or frame having the address of row grabbing terminal 70 as the subsequent frame or page is provided to distribution system 60 with each such page or frame being updateable on a row-by-row basis as described in U.S. Pat. No. 3,889,054. This cycle will preferably be repeated each time a page or frame having address A is transmitted or provided to distribution system 60 from master combiner synchronizer 34, which information is preferably continuously transmitted and recycled as described in U.S. Pat. No. 3,889,054 and updated on a real time row-by-row basis.

If desired, the CATV company can preferably control the dwell time of the pages or frames as well as the content of the pages via the aforementioned two-way data link illustrated in FIG. 1 by means of the local VDU 46 since computer 38 preferably has a responsibility for transmitting pages or frames of such row grabbable data to the distribution system 60 and, subsequently, therefrom to the row grabbing CATV interface terminals 70 through 80. Such control is, of course, limited to the data which is specifically assigned to that CATV company, since computer 38 is preferably dedicated to that company, or at least the portion thereof which is controllable is dedicated to that CATV company, and such control preferably does not enable the CATV company to interfere with the transmission of data from the data base associated with computer 26, such as from a worldwide news service. Preferably, in order to enable such local control by the CATV company, the conventional VDU 46 effectively provides a conventional video editing system with respect to computer 38 which would allow the CATV company to edit its own information. For example, in a large CATV network having several head ends, video editing could be accomplished for each of the head ends independently by assigning certain of the cable network data base to each of the head ends and, thus, allowing each of the head ends to selectively and uniquely edit its own assigned data base portion in order to control the various characteristics of this data. Such control by the CATV company is preferably accomplished via control pages which can be accessed in the same conventional fashion as conventional data pages or frames. These control pages preferably contain the scheduling information for the data assigned to the specific CATV company user and are utilized to instruct the system 20 in its scheduling. These control pages are specifically for local control of computer 38 and are not utilized downstream at the subscriber network 60 since their effect has already been accomplished by controlling the transmission of the data to the subscriber network 60 from computer 38. Thus, the control page may provide such control information as the designation of the first reference page to be output by computer 38, the last reference page or frame to be output by computer 38 as well as the rate or output frequency of pages.

Figure 7:
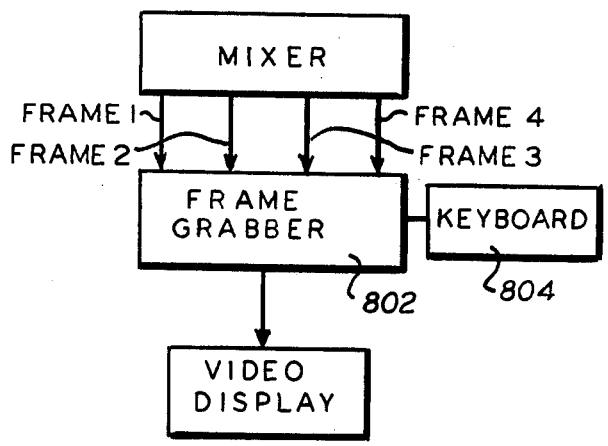
FIG. 7 is a block diagram illustrating one form of multiple frame use for the preferred row grabber receiver interface portion of the improved CATV system of FIG. 1.
Figure 8:
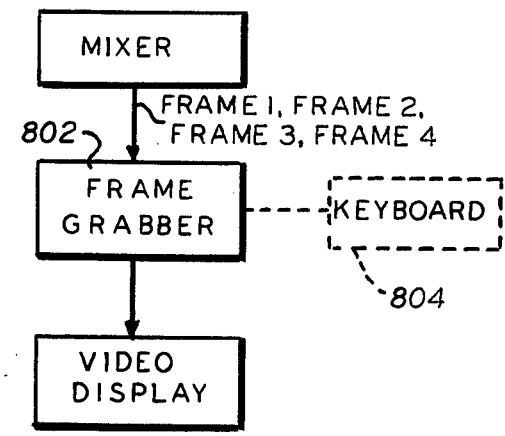
FIG. 8 is a block diagram illustrating another form of multiple frame use for the preferred row grabber receiver interface portion of the improved CATV system of FIG. 1.
Figure 9:
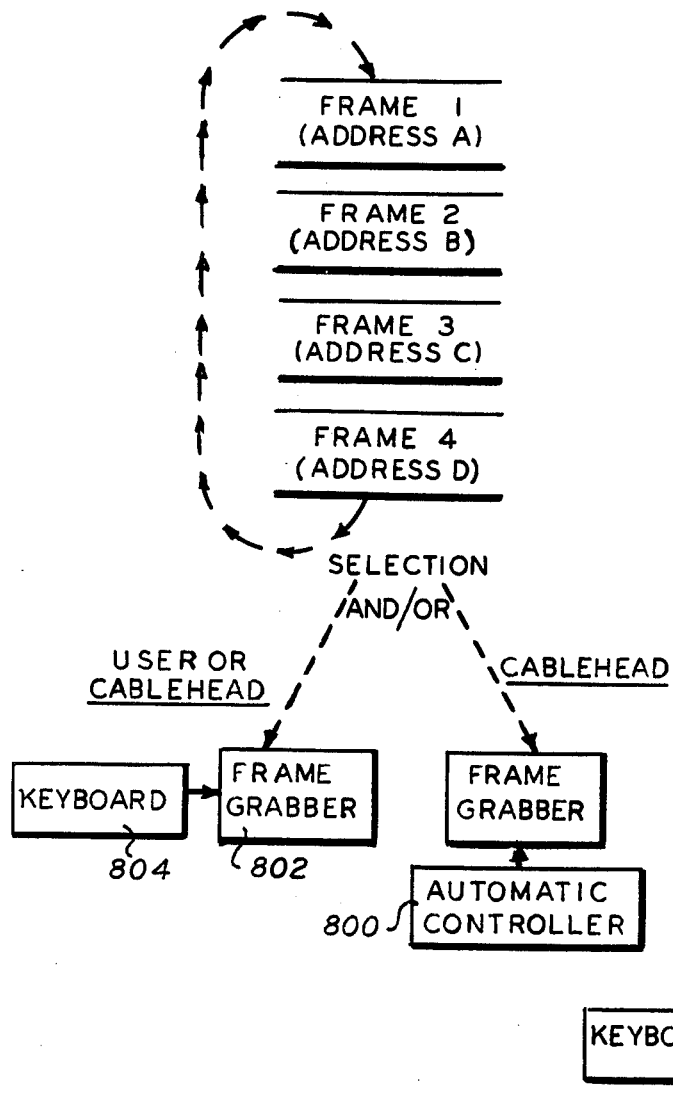
FIG. 9 is another diagrammatic illustration for explaining the operation of the row grabber receiver interface in accordance with FIG. 7.

With respect to the aforementioned cycling of a plurality of different frames or pages of information described with reference to FIG. 10, it should be noted that each page or frame in the cycle is only sequentially obtained, the manner of cycling being analogous to sequential access of data since the user cannot solely select a given page such as in a direct access system. Such a direct access type of approach is illustratively shown in FIG. 9 wherein each page or frame has a different address. In such an instance, a conventional type of automatic controller 800 could automatically vary the sequence of selection by the frame grabber or receiving terminal 70, by way of example, vary the display time thereof and/or group and/or pages or frames within a group so as to enable the cable head to fill a given CATV channel, such as channel A by way of example, with local information while allowing CATV company selection with conventional or standard grabbers of the type described in U.S. Pat. No. 3,889,054, such as represented by reference numerals 802 and 804, to thereby enable keyboard selection of what each channel A through F, by way of example, of the cable head generates, replacing the dedicated grabbers 70 through 80 with the conventional keyboard selectable grabbers 802-804 of the type described in U.S. Pat. No. 3,889,054. Of course, the example illustrated in FIG. 9 requires more transmission capacity than the example illustrated in FIG. 10. Similarly, as shown in FIG. 7 which is analogous to FIG. 9, the grabber 70 can select any one page or frame or can be set to sequentially step through all the pages, whereas in the example illustrated in FIG. 8, which is analogous to FIG. 10, the grabber 70 cannot select any one page but must sequentially step through all the pages or frames. Thus, much more rapid access of information or pages is accomplished in the examples of FIGS. 7 and 9 due to each page or frame having a different address with the access time being at the data rate whereas in the example of FIGS. 8 and 10, the access of data is much slower since all pages being accessed have the same address and, in such an instance, if there is a selection of a given page to be displayed, the grabber 70 will only immediately grab the particular page being sent at that time and the user will have to wait until the data cycles through to the page he desires since the data sent does not distinguish between pages or frames 1 through 4, in the example given, by address.

As used throughout the specification and claims, the terms page, frame, pseudo video scan line and row are defined in the same manner as defined in U.S. Pat. No. 3,889,054. Similarly, with respect to the terms normal CATV television signal information or signal channels, these terms are used in their conventional sense to mean the conventional type of conventional television signal information provided in coventionally known CATV television systems. The term television video scan line is used in its conventional sense as is the term normal television video displayable information which refers to conventional television signal information normally associated with a conventional television receiver. The term multichannel video display device refers to a conventional type of television receiver capable of receiving a plurality of different video channels such as due to use of a conventional tuner. Any other terms used herein, unless otherwise specifically stated, are used in their conventional sense. In addition, all circuitry described herein, unless otherwise identified, is conventional. Moreover, more specific details of the circuitry associated with the row grabbing terminals described herein as well as with the interleaving circuitry described herein are described in the aforementioned U.S. Pat. No. 3,889,054 and aforementioned patent application specifically incorporated by reference herein in their entirety.

What is claimed is:

1. In a CATV type television system having a first common CATV television signal distribution means for distributing a plurality of selectable video displayable television signal channels of different video information content to a plurality of subscriber normal television multichannel video display devices capable of receiving said plurality of channels for providing said selectable video display, and first transmitting means operatively connected to said first common CATV television signal distribution means for providing said plurality of different channels to said first common CATV television signal distribution means; the improvement comprising a real time frame grabbing system for substantially instantaneously providing a selectable continuous video displayable frame or video information to a first video interface means for providing a preselected continuous video displayable frame of said information to at least one of said channels as said video information content thereof from continuously transmittable information, said real time frame grabbing system comprising second means for transmitting said video information as a plurality of pseudo video scan lines, each of said pseudo video scan lines having a television video scan line format and capable of comprising a complete self-contained packet of digital information sufficient to provide an entire displayable row of video data characters, said pseudo video scan line having an associated transmission time equivalent to said television video scan line, said packet of digital information comprising at least address information for said displayable row and data information for said displayable characters in said displayable row, said pseudo video scan line being a composite video signal, said real time frame grabbing system further comprising second television signal distribution means for distributing said transmitted composite pseudo video scan line signals to said first video interface means for providing said preselected frame of said video information to said one channel, said first transmitting means comprising said first video interface means, said first video interface means being operatively connected between said second television signal distribution means and said first common CATV television signal distribution means for processing said distributed composite pseudo video scan line signals for providing a video displayable row from each of said pseudo video scan line signals pertaining to said preselected frame for providing a selected continuous video displayable frame of dedicated information to said one channel, a predetermined plurality of said displayable video rows comprising a displayable video frame of information, whereby a plurality of CATV subscribers may receive a dedicated common channel of preselected frame grabbable information on a normal television signal channel over said CATV television signal distribution means.

2. An improved CATV system in accordance with claim 1 wherein said first video interface means comprises means for updating said preselected frame of information provided to said one channel on a displayable video row-by-row basis dependent on the real time data information content of said transmitted pseudo video scan lines from said second transmtting means, whereby said dedicated common channel frame grabbable information is updateable on a row-by-row basis.

3. An improved CATV system in accordance with claim 2 wherein said updating means comprises memory means for retrievably storing said continuously distributed pseudo video scan line data portion for providing said displayable video row therefrom, said memory means retrievably stored data portion being continuously updateable as said data portion of said pseudo video scan line signal associated therewith is updated.

4. An improved CATV system in accordance with claim 1 wherein said real time frame grabbing system further comprises a second video interface means operatively connected between said second television signal distribution means and said first common CATV television signal distribution means for receiving said transmitted composite pseudo video scan lines for providing a different preselected frame of said video information to a different channel of said plurality of channels, said first transmitting means further comprising said second video interface means, said second video interface means processing said distributed composite pseudo video scan line signals for providing a video displayable row from each of said pseudo video scan line signals pertaining to said different preselected frame for providing a different selected continuous video displayable frame of dedicated information to said different channel, whereby said plurality of CATV subscribers may receive at least two different dedicated common channels of preselected frame grabbable information on two different normal television signal channels over said CATV television signal distribution means.

5. An improved CATV system in accordance with claim 4 wherein said second video interface means comprises means for updating said different preselected frame of information provided to said different channel on a displayable video row-by-row basis dependent on the real time data information content of said transmitted pseudo video scan lines from said second transmitting means, whereby said different dedicated common channel frame grabbable information is updateable on a row-by-row basis.

6. An improved CATV system in accordance with claim 5 wherein said second video interface means updating means comprises memory means for retrievably storing said continuously distributed pseudo video scan line data portion for providing said displayable video row therefrom, said memory means retrievably stored data portion being continuously updateable as said data portion of said pseudo video scan line signal associated therewith is updated.

7. An improved CATV system in accordance with claim 4 wherein said first video interface means comprises means for updating said preselected frame of information provided to said one channel on a displayable video row-by-row basis dependent on the real time data information content of said transmitted pseudo video scan lines from said second transmitting means, whereby said dedicated common channel frame grabbable information is updateable on a row-by-row basis.

8. An improved CATV system in accordance with claim 7 wherein said second video interface means comprises means for updating said different preselected frame of information provided to said different channel on a displayable video row-by-row basis dependent on the real time data information content of said transmitted pseudo video scan lines from said second transmitting means, whereby said different dedicated common channel frame grabbable, information is updateable on a row-by-row basis.

9. An improved CATV system in accordance with claim 7 wherein said updating means comprises memory means for retrievably storing said continuously distributed pseudo video scan line data portion for providing said displayable video row therefrom, said memory means retrievably stored data portion being continuously updateable as said data portion of said pseudo video scan line signal associated therewith is updated.

10. An improved CATV system in accordance with claim 9 wherein said second video interface means comprises means for updating said different preselected frame of information provided to said different channel on a displayable video row-by-row basis dependent on the real time data information content of said transmitted pseudo video scan lines from said second transmitting means, whereby said different dedicated common channel frame grabbable information is updateable on a row-by-row basis.

11. An improved CATV system in accordance with claim 10 wherein said second video interface means updating means comprises memory means for retrievably storing said continuously distributed pseudo video scan line data portion for providing said displayable video row therefrom, said memory means retrievably stored data portion being continuously updateable as said data portion of said pseudo video scan line signal associated therewith is updated.

12. An improved CATV system in accordance with claim 4 wherein said first transmitting means further comprises means operatively connected to said first common CATV television signal distribution means for providing normal television video displayable information directly to at least one other different channel of said plurality of channels, whereby each of said plurality of CATV subscribers may receive both normal television video displayable information and dedicated frame grabbable information on said plurality of different channels over said CATV television signal distribution means for selectable video display thereof dependent on the normal television signal channel selected for said video display on said subscriber normal television multichannel video display device.

13. An improved CATV system in accordance with claim 1 wherein said first transmitting means further comprises means operatively connected to said first common CATV television signal distribution means for providing normal television video displayable information directly to at least one other different channel of said plurality of channels, whereby each of said plurality of CATV subscribers may receive both normal television video displayable information and dedicated frame grabbable information on said plurality of different channels over said CATV television signal distribution means for selectable video display thereof dependent on the normal television signal channel selected for said video display on said subscriber normal television mutlichannel video display device.

14. An improved CATV system in accordance with claim 1 wherein said second transmitting means comprises means for providing a plurality of different frames of said frame grabbable information having a common address, said common address being said address of said preselected frame, said pseudo video scan line address information uniquely defining a row in one of said common frame address different frames, said first video interface processing means comprising means for cyclically providing said plurality of common address frames as said dedicated information to said one channel as said distributed composite pseudo video scan line signals pertaining to each of said plurality of common address frames is received by said first video interface means.

15. An improved CATV system in accordance with claim 14 wherein said real time frame grabbing system further comprises a second video interface means operatively connected between said second television signal distribution means and said first common CATV television signal distribution means for receiving said transmitted composite pseudo video scan lines for providing a different preselected frame of said video information to a different channel of said plurality of channels, said first transmitting means further comprising said second video interface means, said secon video interface means processing said distributed composite pseudo video scan line signals for providing a video displayable row from each of said pseudo video scan line signals pertaining to said different preselected frame for providing a different selected continuous video displayable frame of dedicated information to said different channel, whereby said plurality of CATV subscribers may receive at least two different dedicated common channels of preselected frame grabbable information on two different normal television signal channels over said CATV television signal distribution means.

16. An improved CATV system in accordance with claim 15 wherein said second transmitting means further comprises means for providing a different plurality of different frames of said frame grabbable information having a different common address, said different common address being said address of said different preselected frame, said pseudo video scan line address information uniquely defining a row in one of said different common frame address different frames, said second video interface processing means comprising means for cyclically providing said plurality of different common address frames as said different dedicated information to said different channel as said distributed composite pseudo video scan line signals pertaining to each of said plurality of different common address frames is received by said second video interface means.

17. An improved CATV system in accordance with claim 14 wherein said first video interface means comprises meand for updating each of said common address frames of information provided to said one channel on a displayable video row-by-row basis dependent on the real time data information content of said transmitted pseudo video scan lines from said second transmitting means, whereby said dedicated common channel frame grabbable information is updateable on a row-by-row basis.

18. An improved CATV system in accordance with claim 17 wherein said updating means comprises memory means for retrievably storing said continuously distributed pseudo video scan line data portion for providing said displayable video row therefrom, said memory means retrievably stored data portion being continuously updateable as said data portion of said pseudo video scan line signal associated therewith is updated.

19. An improved CATV system in accordance with claim 17 wherein said real time frame grabbing system further comprises a second video interface means operatively connected between said second television signal distribution means and said first common CATV television signal distribution means for receiving said transmitted composite pseudo video scan lines for providing a different preselected frame of said video information to a different channel of said plurality of channels, said first transmitting means further comprising said second video interface means, said second video interface means processing said distributed composite pseudo video scan line signals for providing a video displayable row from each of said pseudo video scan line signals pertaining to said different preselected frame for providing a different selected continuous video displayable frame of dedicated information to said different channel, whereby said plurality of CATV subscribers may receive at least two different dedicated common channels of preselected frame grabbable information on two different normal television signal channels over said CATV television signal distribution means.

20. An improved CATV system in accordance with claim 19 wherein said second transmitting means further comprises means for providing a different plurality of different frames of said frame grabbable information having a different common address, said different common address being said address of said different preselected frame, said pseudo video scan line address information uniquely defining a row in one of said different common frame address different frames, said second video interface processing means comprising means for cyclically providing said plurality of different common address frames as said different dedicated information to said different channel as said distributed composite pseudo video scan line signals pertaining to each of said plurality of different common address frames is received by said second video interface means.

21. An improved CATV system in accordance with claim 20 wherein said second video interface means comprises means for updating each of said different common address frames of information provided to said different channel on a displayable video row-by-row basis dependent on the real time data information content of said transmitted pseudo video scan lines from said second transmitting means, whereby said different dedicated common channel frame grabbable information is updateable on a row-by-row basis.

22. An improved CATV system in accordance with claim 21 wherein said second video interface means updating means comprises memory means for retrievably storing said continuously distributed pseudo video scan line data portion for providing said displayable video row therefrom, said memory means retrievably stored data portion being continuously updateable as said data portion of said pseudo video scan line signal associated therewith is updated.

23. An improved CATV system in accordance with claim 1 wherein said second transmitting means comprises means for providing said video information as a composite combined interleaved plurality of said pseudo video scan lines, said second television signal distribution means distributing said provided transmitted composite combined interleaved pseudo video scan line signals to said first video interface means as said transmitted composite pseudo video scan line signals, said composite combined interleaved pseudo video scan line providing means comprising third means for transmitting said preselected video frame video information as a first plurality of combinable interleavable pseudo video scan lines and fourth means for transmitting said preselected video frame video information as a second plurality of combinable interleavable pseudo video scan lines and means for selectively combining and interleaving said first and second plurality of transmitted combinable interleavable pseudo video scan lines for providing said composite combined interleaved plurality of pseudo video scan lines therefrom, a plurality of said composite combined interleaved pseudo video scan lines comprising said preselected frame of video information.

24. An improved CATV system in accordance with claim 23 wherein said third transmitting means comprises video editing means for selectively editing the data information content of said first plurality of combinable interleavable pseudo video scan lines.

25. An improved CATV system in accordance with claim 24 wherein said fourth transmitting means comprises a remote source of said second plurality of combinable interleavable pseudo video scan lines and said video editing means comprises a local source of said first plurality of combinable interleavable pseudo video scan lines video edit controllable at said first common CATV television signal distribution means, said remote source pseudo video scan line data information content not being video edit controllable at said local source.

26. An improved CATV system in accordance with claim 24 wherein said first video interface means comprises means for updating said preselected frame of information provided to said one channel on a displayable video row-by-row basis dependent on the real time data information content of said transmitted pseudo video scan lines from said second transmitting means, whereby said dedicated common channel frame grabbable information is updateable on a row-by-row basis.

27. An improved CATV system in accordance with claim 26 wherein said updating means comprises memory means for retrievably storing said continuously distributed pseudo video scan line data portion for providing said displayable video row therefrom, said memory means retrievably stored data portion being continuously updateable as said data portion of said pseudo video scan line signal associated therewith is updated.

28. An improved CATV system in accordance with claim 24 wherein said real time frame grabbing system further comprises a second video interface means operatively connected between said second television signal distribution means and said first common CATV television signal distribution means for receiving said transmitted composite pseudo video scan lines for providing a different preselected frame of said video information to a different channel of said plurality of channels, said first transmitting means further comprising said second video interface means, said second video interface means processing said distributed composite pseudo video scan line signals for providing a video displayable row from each of said pseudo video scan line signals pertaining to said different preselected frame for providing a different selected continuous video displayable frame of dedicated information to said different channel, whereby said plurality of CATV subscribers may receive at least two different dedicated common channels of preselected frame grabbable information on two different normal television signal channels over said CATV television signal distribution means.

29. An improved CATV system in accordance with claim 28 wherein said second video interface means comprises means for updating said different preselected frame of information provided to said different channel on a displayable video row-by-row basis dependent on the real time data information content of said transmitted pseudo video scan lines from said second transmitting means, whereby said different dedicated common channel frame grabbable information is updateable on a row-by-row basis.

30. An improved CATV system in accordance with claim 29 wherein said second video interface means updating means comprises memory means for retrievably storing said continuously distributed pseudo video scan line data portion for providing said displayable video row therefrom, said memory means retrievably stored data portion being continuously updateable as said data portion of said pseudo video scan line signal associated therewith is updated.

31. An improved CATV system in accordance with claim 28 wherein said first video interface means comprises means for updating said preselected frame of information provided to said one channel on a displayable video row-by-row basis dependent on the real time data information content of said transmitted pseudo video scan lines from said second transmitting means, whereby said dedicated common channel frame grabbable information is updateable on a row-by-row basis.

32. An improved CATV system in accordance with claim 31 wherein said second video interface means comprises means for updating said different preselected frame of information provided to said different channel on a displayable video row-by-row basis dependent on the real time data information content of said transmitted pseudo video scan lines from said second transmitting means, whereby said different dedicated common channel frame grabbable information is updateable on a row-by-row basis.

33. An improved CATV system in accordance with claim 31 wherein said updating means comprises memory means for retrievably storing said continuously distributed pseudo video scan line data portion for providing said displayable video row therefrom, said memory means retrievably stored data portion being continuously updateable as said data portion of said pseudo video scan line signal associated therewith is updated.

34. An improved CATV system in accordance with claim 33 wherein said second video interface means comprises means for updating said different preselected frame of information provided to said different channel on a displayable video row-by-row basis dependent on the real time data information content of said transmitted pseudo video scan lines from said second transmitting means, whereby said different dedicated common channel frame grabbable information is updateable on a row-by-row basis.

35. An improved CATV system in accordance with claim 34 wherein said second video interface means updating means comprises memory means for retrievably storing said continuously distributed pseudo video scan line data portion for providing said displayable video row therefrom, said memory means retrievably stored data portion being continuously updateable as said data portion of said pseudo video scan line signal associated therewith is updated.

36. An improved CATV system in accordance with claim 28 wherein said first transmitting means further comprises means operatively connected to said first common CATV television signal distribution means for providing normal television video displayable information directly to at least one other different channel of said plurality of channels, whereby each of said plurality of CATV subscribers may receive both normal television video displayable information and dedicated frame grabbable information on said plurality of different channels over said CATV television signal distribution means for selectable video display thereof dependent on the normal television signal channel selected for said video display on said subscriber normal television multichannel video display device.

37. An improved CATV system in accordance with claim 24 wherein said first transmitting means further comprises means operatively connected to said first common CATV television signal distribution means for providing normal television video displayable information directly to at least one other different channel of said plurality of channels, whereby each of said plurality of CATV subscribers may receive both normal television video displayable information and dedicated frame grabbable information on said plurality of different channels over said CATV television signal distribution means for selectable video display thereof dependent on the normal television signal channel selected for said video display on said subscriber normal television mutlichannel video display device.

38. An improved CATV system in accordance with claim 23 wherein said first transmitting means further comprises means operatively connected to said first common CATV television signal distribution means for providing normal television video displayable information directly to at least one other different channel of said plurality of channels, whereby each of said plurality of CATV subscribers may receive both normal television video displayable information and dedicated frame grabbable information on said plurality of different channels over said CATV television signal distribution means for selectable video display thereof dependent on the normal television signal channel selected for said video display on said subscriber normal television multichannel video display device.

* * * * *